(12) United States Patent
Jun

(10) Patent No.: US 12,313,967 B2
(45) Date of Patent: May 27, 2025

(54) APERTURE MODULE AND CAMERA MODULE INCLUDING THE SAME

(71) Applicant: Samsung Electro-Mechanics Co., Ltd., Suwon-si (KR)

(72) Inventor: Jaewoo Jun, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 18/089,681

(22) Filed: Dec. 28, 2022

(65) Prior Publication Data

US 2024/0061318 A1    Feb. 22, 2024

(30) Foreign Application Priority Data

Aug. 18, 2022    (KR) .................. 10-2022-0103266

(51) Int. Cl.
*G03B 9/06*    (2021.01)
(52) U.S. Cl.
CPC ..................... *G03B 9/06* (2013.01)
(58) Field of Classification Search
None
See application file for complete search history.

(56) References Cited

U.S. PATENT DOCUMENTS

| | | | | |
|---|---|---|---|---|
| 7,157,706 B2 * | 1/2007 | Gat | ............. | H04N 23/75 250/347 |
| 7,472,998 B2 | 1/2009 | Sasazaki et al. | | |
| 2008/0199177 A1 | 8/2008 | Ide | | |
| 2020/0026149 A1 | 1/2020 | Jun | | |
| 2020/0301246 A1 * | 9/2020 | Seo | ............. | H04N 23/55 |
| 2021/0109305 A1 * | 4/2021 | Hu | ............. | G02B 5/005 |
| 2022/0382128 A1 | 12/2022 | Lee | | |

(Continued)

FOREIGN PATENT DOCUMENTS

| | | | |
|---|---|---|---|
| CN | 113259545 A | | 8/2021 |
| CN | 114488653 A | * | 5/2022 |
| JP | 2008-203601 A | | 9/2008 |

(Continued)

OTHER PUBLICATIONS

Korean Office Action issued on Aug. 22, 2024, in counterpart Korean Patent Application No. 10-2022-0103266 (8 pages in English, 7 pages in Korean).

(Continued)

*Primary Examiner* — Clayton E. LaBalle
*Assistant Examiner* — Diana Hancock
(74) *Attorney, Agent, or Firm* — NSIP Law

(57) ABSTRACT

An aperture module including: a base defining a central opening; a rotation plate rotatably seated on the base about an optical axis; an aperture driver coupled with the rotation plate to rotate the rotation plate according to an input electrical signal; and a plurality of blades disposed inside the rotation plate and interlocking with the rotation of the rotation plate to form an incident hole of variable size. Each of the blades includes a blade tooth form at an outer end portion thereof, and the rotation plate includes a rotation plate tooth form disposed along an inner circumferential surface thereof to engage with a respective blade tooth form of each of the plurality of blades.

14 Claims, 25 Drawing Sheets

(56) References Cited

U.S. PATENT DOCUMENTS

2023/0236476 A1* 7/2023 Chen .................. G03B 3/10
　　　　　　　　　　　　　　　　　　　396/510

FOREIGN PATENT DOCUMENTS

| | | |
|---|---|---|
| JP | 2010-204420 A | 9/2010 |
| JP | 6021475 B2 | 11/2016 |
| JP | 2022-511419 A | 1/2022 |
| KR | 10-2020-0009822 A | 1/2020 |
| KR | 10-2139771 B1 | 7/2020 |
| KR | 20230010416 A * | 1/2023 |
| WO | WO 2020/124553 A1 | 6/2020 |

OTHER PUBLICATIONS

Korean Final Office Action issued on Mar. 18, 2025, in corresponding Korean Patent Application No. 10-2022-0103266. (5pages in English, 5pages in Korean).

* cited by examiner

APERTURE MODULE AND CAMERA MODULE INCLUDING THE SAME

CROSS-REFERENCE TO RELATED APPLICATION

This application claims priority to and the benefit under 35 USC 119(a) of Korean Patent Application No. 10-2022-0103266 filed in the Korean Intellectual Property Office on Aug. 18, 2022, the entire contents of which are incorporated herein by reference for all purposes.

BACKGROUND

Field

The following description relates to an aperture module and a camera module including the same.

Description of the Background

Cameras have been basically employed in portable electronic devices such as smartphones, tablet PCs, and laptop computers. As competition for product differentiation in portable electronic devices intensifies, cases of applying functions of general digital cameras to cameras of portable electronic devices are increasing. Among them, a demand for obtaining a Bokeh effect or a bright and clear picture by controlling an amount of light by using a variable aperture is also increasing.

A general digital camera is provided with a mechanical aperture, which is driven to change an amount of light incident according to a photographing environment. However, in a case of a camera module applied to a small device such as a portable electronic device, it is difficult to apply such a mechanical aperture due to structural characteristics and spatial limitations.

That is, the mechanical aperture applied to the general digital camera has a large number of parts, and a large number of rotating blades thereof have a circular aperture structure, so that a thickness thereof increases. Therefore, it is necessary to develop an aperture that is advantageous for down-sizing and thinness, which is advantageous for application to portable electronic devices.

The above information disclosed in this Background section is only for enhancement of understanding of the background of the invention, and therefore it may contain information that does not form the prior art that is already known in this country to a person of ordinary skill in the art.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an aperture module includes: a base defining a central opening; a rotation plate rotatably seated on the base about an optical axis; an aperture driver coupled with the rotation plate and configured to rotate the rotation plate according to an input electrical signal; and a plurality of blades disposed inside the rotation plate and interlocking with the rotation of the rotation plate to form an incident hole of variable size. Each of the plurality of blades includes a blade tooth form at an outer end portion thereof, and the rotation plate includes a rotation plate tooth form disposed along an inner circumferential surface thereof and configured to engage with a respective blade tooth form of each of the plurality of blades.

The aperture driver may include a worm gear coupled to the rotation plate and a motor having one end connected to the worm gear and configured to rotate the worm gear according to the input electrical signal.

The base may include a driver case defining an inner space in which the motor and the worm gear are seated at one side of the base.

The rotation plate may include a rotation part configured to rotate by a driving force provided by the worm gear and an extension connected to an outer portion of the rotation part and extending in an optical axis direction and gear-coupled with the worm gear.

The plurality of blades may be stacked to form a common plane with the rotation part.

The aperture driver may include a rotor coupled to the rotation plate and a shape memory alloy (SMA) wire having a first end connected to the rotor to rotate the rotor according to the input electrical signal.

A second end of the SMA wire may be fixed to the base.

The base may include a step portion extending along an edge thereof, and the SMA wire may be supported by the step portion and may extend along the edge of the base.

The rotor may include a rotation driver coupled to a rotation shaft pillar protruding from an upper end of one corner area of the base and a driving arm part including a driving protrusion protruding upward from an end portion of an arm extending from the rotation driver, and the first end of the SMA wire may be fixed to the rotation driver.

The first end of the SMA wire may be fixed to a side surface of the rotation driver with a clamp.

A second end of the SMA wire may fixed to the base in a diagonally opposite corner area of a corner area of the base in which the rotation shaft pillar is disposed.

The SMA wire may include a first shape memory alloy wire and a second shape memory alloy wire that extend in opposite directions along an edge of the base to both sides of the rotor.

The plurality of blades may be stacked in at least three stages inside the inner circumferential surface of the rotation plate, and each stage may include at least four blades disposed so as to not overlap each other.

Each of the plurality of blades may include a driving section including a fixing shaft hole coupled to a fixing shaft protrusion protruding from the base and the respective blade tooth form and a shielding section having a first edge extending straight from the driving section toward the central opening.

The shielding section of each of the plurality of blades may include a second edge extending from the driving section toward the inner circumferential surface of the rotation plate and opposite to the first edge, and the second edge may include two sides bent at different angles.

The shielding section of each of the plurality of blades may include an inner end portion connecting the first edge and the second edge, and in a state in which the central opening of the base is maximally blocked, the inner end portion may be configured to partially contact a first edge of an adjacent blade.

Each of the plurality of blades may be configured to partially overlap two blades adjacent to each other and disposed at an upper stage or a lower stage in a state in which the central opening of the base is fully opened.

The plurality of blades may be configured to form a maximum dodecagonal incident hole.

In another general aspect, a camera module includes: a housing defining with an inner space; a lens driving module accommodated in the inner space of the housing; and an aperture module disposed in front of the lens driving module and configured to adjust a size of an incident hole, wherein the aperture module includes: a base defining a central opening; a rotation plate rotatably seated on the base about an optical axis; an aperture driver coupled with the rotation plate and configured to rotate the rotation plate according to an input electrical signal; and a plurality of blades disposed inside the rotation plate and interlocking with the rotation of the rotation plate to form the incident hole. Each of the plurality of blades includes a blade tooth form at an outer end portion thereof, and the rotation plate includes a rotation plate tooth form disposed along an inner circumferential surface thereof and configured to engage with a respective blade tooth form of each of the plurality of blades.

The aperture driver may include a worm gear coupled to the rotation plate, and a motor having one end connected to the worm gear and configured to rotate the worm gear according to the input electrical signal.

The rotation plate may include a rotation part configured to rotate by driving force provided by the worm gear, and an extension part connected to an outer portion of the rotation part and gear-coupled with the worm gear; and the plurality of blades may be stacked to form a common plane with the rotation part.

The aperture driver may include a rotor coupled to the rotation plate, and a shape memory alloy (SMA) wire having at least one end connected to the rotor to rotate the rotor according to the input electrical signal.

Each of the plurality of blades may be stacked to form a common plane with the rotation plate.

The plurality of blades may be stacked in at least three stages inside the inner circumferential surface of the rotation plate, and each stage may include at least four blades disposed so as to not overlap each other.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

Figure 1:
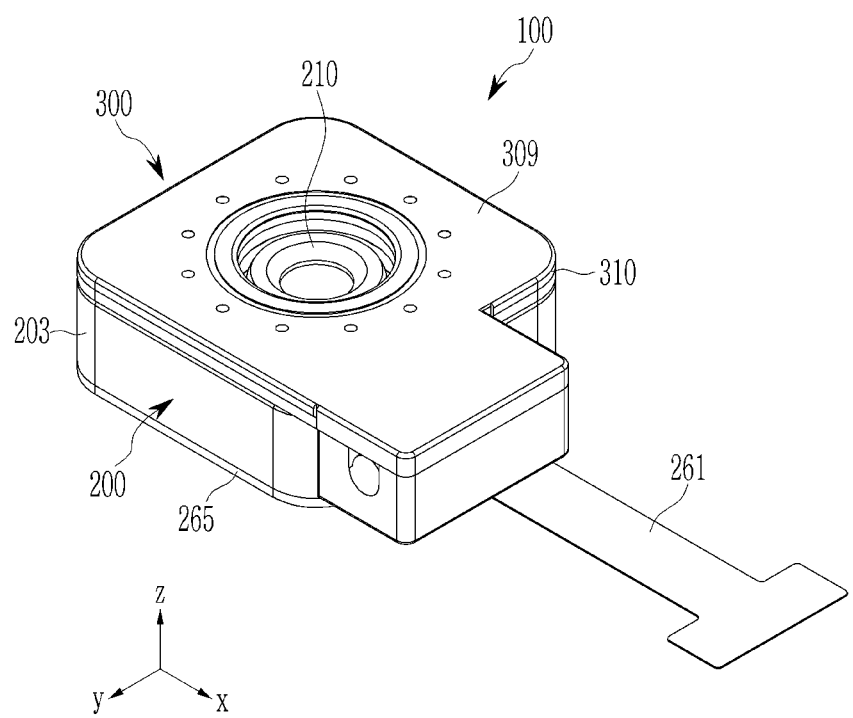
FIG. 1 illustrates a perspective view of an appearance of a camera module according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

Figure 2:
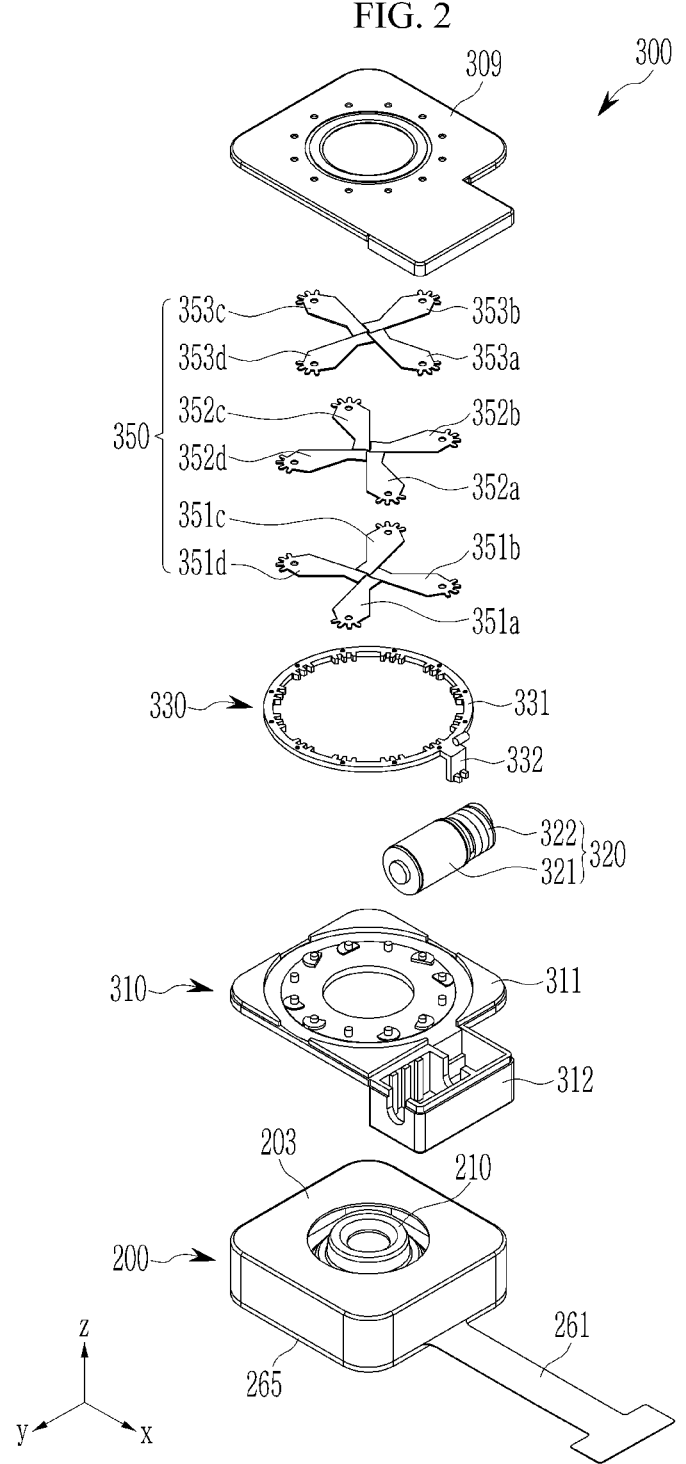
FIG. 2 illustrates an exploded perspective view of an aperture module of the camera module illustrated in FIG. 1.

FIG. 1 illustrates a perspective view of an appearance of a camera module according to an example, and FIG. 2 illustrates an exploded perspective view of an aperture module of the camera module illustrated in FIG. 1.

Referring to FIG. 1 and FIG. 2, a camera module 100 may include a housing 203 defining an inner space, a lens driving module 210 accommodated in the inner space, and an aperture module 300 disposed in front of the lens driving module 210 to adjust a size of an incident hole.

An inner space of the housing 203 in which the lens driving module 210 is accommodated may be covered with a cover. An image sensor unit may be disposed on a circuit board 265 on a bottom surface of the housing 203 to generate an electrical image signal in response to incident light information. A flexible printed circuit board 261 may extend outside the housing 203 to transmit the generated image signal to an external circuit. The lens driving module 210 accommodated in the housing 203 covered with the cover may configure an imaging module 200.

The lens driving module 210 may include a lens module including a lens, and a lens driver for driving the lens module in an optical axis direction or in a direction perpendicular to the optical axis.

The lens module may include a lens barrel including a plurality of lenses for imaging a subject and a holder for accommodating the lens barrel. The lens module may be configured to be accommodated in a carrier to move in an optical axis direction for auto-focusing. In addition, the lens module may be driven in a direction perpendicular to the optical axis for optical image stabilization within the carrier.

The lens driver may include an auto focus (AF) driver for driving the lens module together with the carrier in an optical axis direction, and an optical image stabilization (OIS) driver for driving the lens module in a direction perpendicular to the optical axis in the carrier. The AF driver may adjust the focus by moving the lens module in the optical axis direction (a z-axis direction in the drawing), and the OIS driver may correct hand shake or screen shake when shooting by moving the lens module in a direction perpendicular to the optical axis (an x-axis direction or a y-axis direction in the drawing).

For example, the AF driver may include an AF driving magnet and an AF driving coil, and the OIS driver may include an OIS driving magnet and an OIS driving coil. However, the lens driver is not limited thereto, and may be implemented as various driving parts for moving the lens module in the optical axis direction or in a direction perpendicular to the optical axis, which also are within the scope of the present disclosure.

Referring to FIG. 2, the aperture module 300 applied to the camera module 100 may be disposed at an upper portion of the imaging module 200, and may be positioned in front of the lens driving module 210 based on a light incident direction. The aperture module 300 may be configured by sequentially stacking and combining a rotation plate 330 and blades (350, 351a, 351b, 351c, 351d, 352a, 352b, 352c, 352d, 353a, 353b, 353c, and 353d) stacked sequentially on a base 310. The base 310 may include a driver case 312 on which an aperture driver 320 is seated on one side of an edge thereof, and a flat part 311 except for the driver case 312. The aperture driver 320 may include a step motor 321 and a worm gear 322.

The rotation plate 330 may include a rotation part 331 disposed on the flat part 311 of the base 310, and an extension 332 connected to the outside of the rotation part 331 to extend in the optical axis direction (Z-axis direction). An aperture cover 309 may be coupled thereto to cover an upper portion thereof to protect the components of the aperture module 300.

The aperture module 300 may include 12 three-stage blades (350; 351a, 351b, 351c, 351d, 352a, 352b, 352c, 352d, 353a, 353b, 353c, and 353d). That is, the blade 350 may be stacked in three stages inside an inner circumferential surface of the rotation plate 330, and four blades (of 351a, 351b, 351c, 351d; 352a, 352b, 352c, 352d; 353a, 353b, 353c, and 353d) may be disposed to not overlap each other at each stage.

FIG. 3A to FIG. 3H illustrate perspective views of a process of assembling components of an aperture module of the camera module illustrated in FIG. 1.

Figure 3A:
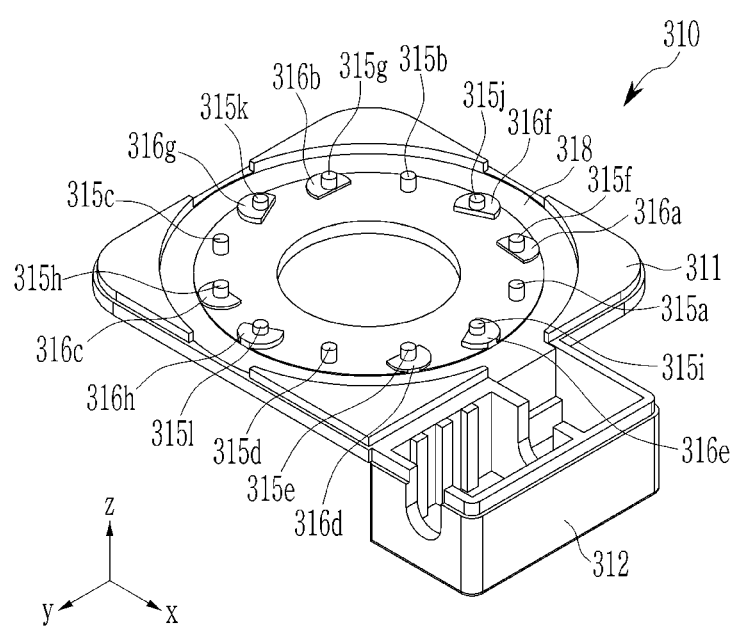
FIGS. 3A, 3B, 3C, 3D, 3E, 3F, 3G, and FIG. 3H illustrate perspective views of a process of assembling components of an aperture module of the camera module illustrated in FIG. 1.

Referring to FIG. 3A, the base 310 has a central opening, and may be formed to have a planar shape that is substantially quadrangular or square. The driver case 312 of the base 310 may have an inner space in which the step motor 321 and a worm gear 322 are seated. The inner space of the driver case 312 may be divided into a space in which the step motor 321 is seated and a space in which the worm gear 322 is seated, by a partition wall.

The base 310 includes a seating groove 318 in which the rotation plate 330 is seated, and the seating groove 318 may be formed to have a shape that matches a shape of the rotation plate 330, and for example, it may be formed to have an annular shape. On a plane between the seating groove 318 of the base 310 and the central opening thereof, fixing shaft protrusions (315a, 315b, 315c, 315d, 315e, 315f, 315g, 315h, 315i, 315j, 315k, and 315l) may be disposed at equal angles around the optical axis along an inner circumference of the seating groove 318. Some of the fixing shaft protrusions (315e, 315f, 315g, 315h, 315i, 315j, 315k, and 315l) may be configured in combination with guide members (316a, 316b, 316c, 316d, 316e, 316f, 316g, and 316h). Each guide member (316a, 316b, 316c, 316d, 316e, 316f, 316g, or 316h) may have a semicircular shape. The guide members (316a, 316b, 316c, 316d, 316e, 316f, 316g, or 316h) may be in contact with an edge positioned on an edge of each of the plurality of the blades (351a, 351b, 351c, 351d, 352a, 352b, 352c, 352d, 353a, 353b, 353c, and 353d) to guide a coupling position of each of the plurality of blades (351a, 351b, 351c, 351d, 352a, 352b, 352c, 352d, 353a, 353b, 353c, and 353d).

Figure 3B:
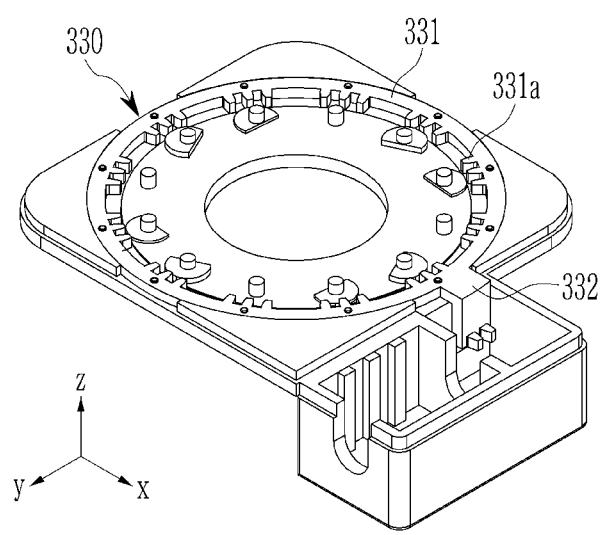

Referring to FIG. 3B, the rotation plate 330 may be inserted and seated in the seating groove 318 of the base 310. The rotation plate 330 may be formed of an annular disc, and may be rotatably seated about the optical axis on the base 310. The rotation plate 330 may include the rotation part 331 that rotates by the driving force provided by the worm gear 322, and the extension 332 that is connected to an outer part of the rotation part 331 to extend in the optical axis direction and that is disposed to be in contact with an inner sidewall of the driver case 312. The extension 332 may be coupled with the worm gear 322 to transmit the driving force provided by the worm gear 322 to the rotation part 331. The rotation part 331 may be provided with a rotation plate tooth form 331a on an inner circumferential surface thereof. The rotation plate tooth form 331a may have a shape in which tooth form structures are disposed at constant intervals about the optical axis along an inner circumference of the rotation part 331.

Figure 3C:
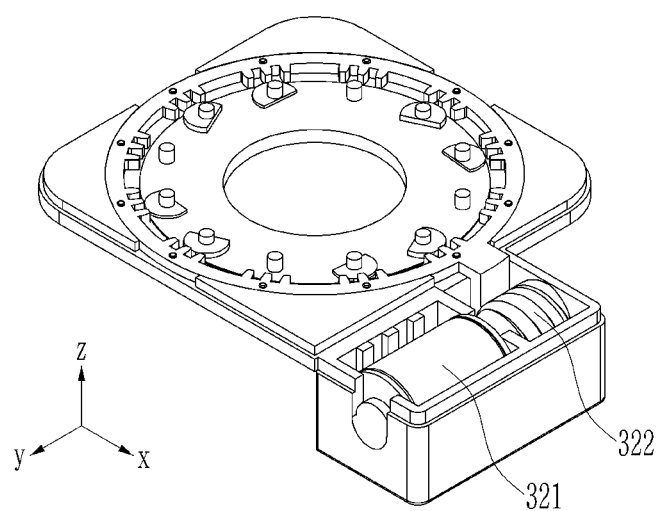
Figure 3D:
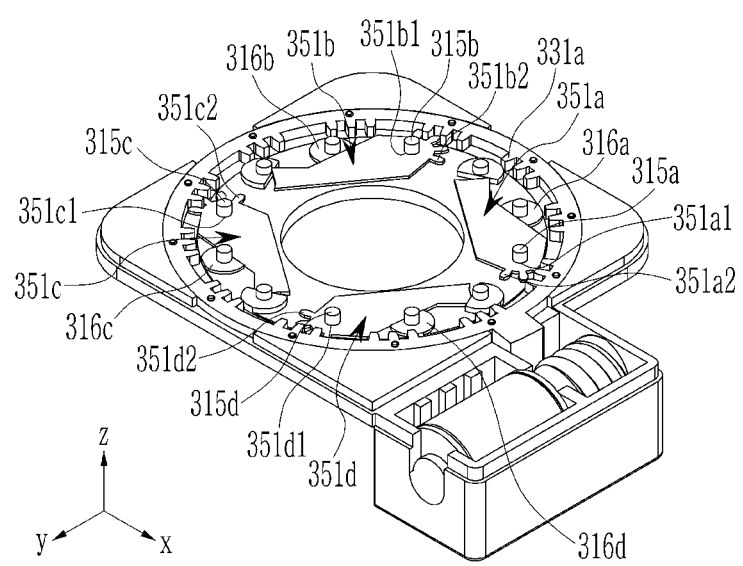
Figure 3E:
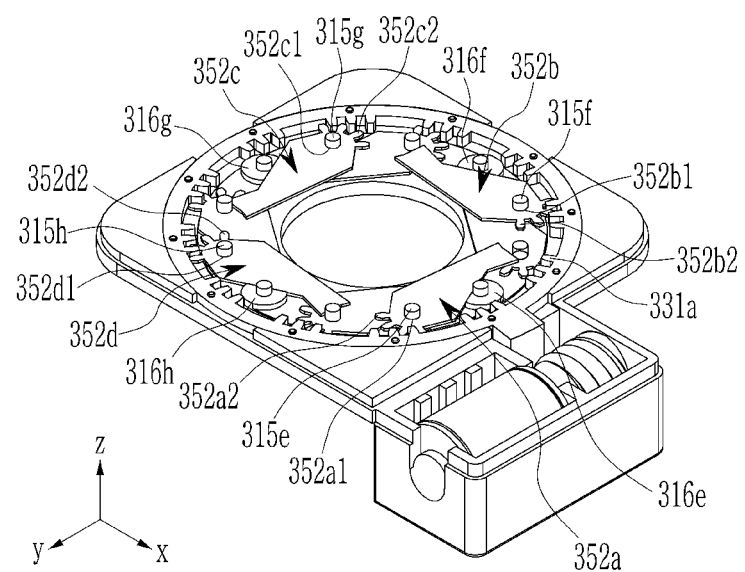
Figure 3F:
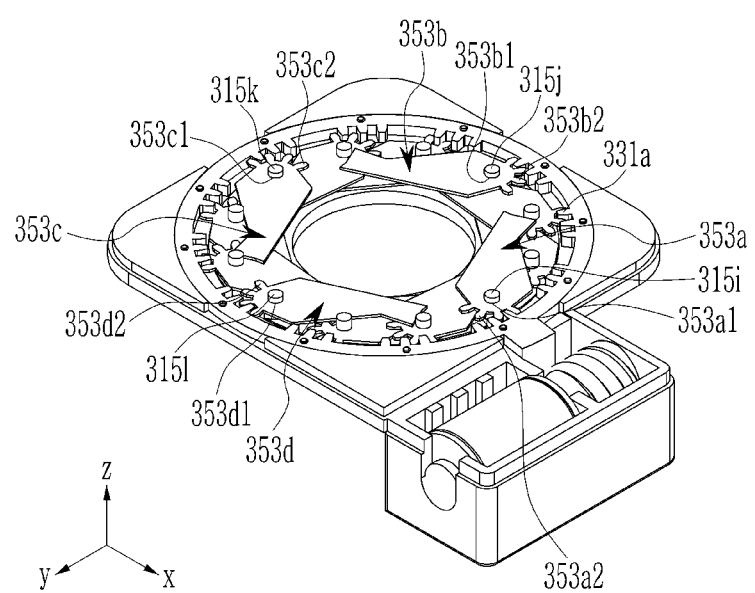

Referring to FIG. 3C, the worm gear 322 and the step motor 321 may be accommodated in the inner space of the driver case 312. The worm gear 322 may be gear-coupled with the extension 332 of the rotation plate 330 to provide rotation driving force. The worm gear 322 may have a cylinder shape having an axis parallel to one edge of the base 310, and on an outer surface of the worm gear 322, a screw-shaped gear tooth form configured to engage with the toothed portion of the extension 332 may be positioned. One end of the worm gear 322 may be connected to the step motor 321. The step motor 321 may be configured to rotate the worm gear 322 connected to one end thereof according to an input electrical signal. Therefore, when the worm gear 322 rotates about an axis thereof, the extension 332 of the rotation plate 330 moves in an axial direction of the worm gear 322, and the rotation part 331 of the rotation plate 330 may rotate on the base 310.

Referring to FIG. 3D to FIG. 3F and FIG. 4, the plurality of blades (351a, 351b, 351c, 351d, 352a, 352b, 352c, 352d, 353a, 353b, 353c, and 353d) may be sequentially stacked in three stages inside the inner circumferential surface of the rotation plate 330. The plurality of blades (351a, 351b, 351c, 351d, 352a, 352b, 352c, 352d, 353a, 353b, 353c, and 353d) may be stacked to form the same plane as the rotation part 331. That is, the plurality of blades (351a, 351b, 351c, 351d, 352a, 352b, 352c, 352d, 353a, 353b, 353c, and 353d) stacked inside the inner circumferential surface of the rotation part 331 may be maintained to have the same height as the rotation part 331. Four blades (351a, 351b, 351c, and 351d; 352a, 352b, 352c, and 352d; or 353a, 353b, 353c, and 353d) may be disposed at each stage to form point symmetry with respect to the center of the opening of the base 310. In addition, each of the plurality of blades (351a, 351b, 351c, 351d, 352a, 352b, 352c, 352d, 353a, 353b, 353c, and 353d) may be disposed to partially overlap two blades (of 351a, 351b, 351c, 351d, 352a, 352b, 352c, 352d, 353a, 353b, 353c, and 353d) disposed at an upper portion or a lower portion adjacent to each other in a state in which the central opening of the base 310 is fully opened.

Each of the blades (351a, 351b, 351c, 351d, 352a, 352b, 352c, 352d, 353a, 353b, 353c, and 353d) may include a driving section (352a3, 352b3, 352c3, 352d3, 353a3, 353b3, 353c3, or 353d3, for example) driven to rotate about the fixing shaft protrusion (315a, 315b, 315c, 315d, 315e, 315f, 315g, 315h, 315i, 315j, 315k, or 315l) of the base 310 and a shielding section (352a4, 352b4, 352c4, 352d4, 353a4, 353b4, 353c4, or 353d4, for example) extending from the driving section (352a3, 352b3, 352c3, 352d3, 353a3, 353b3, 353c3, or 353d3). The driving section (352a3, 352b3, 352c3, 352d3, 353a3, 353b3, 353c3, or 353d3) of the blade may include a fixing shaft hole (351a1, 351b1, 351c1, 351d1, 352a1, 352b1, 352c1, 352d1, 353a1, 353b1, 353c1, or 353d1) coupled to the fixing shaft protrusion (315a, 315b, 315c, 315d, 315e, 315f, 315g, 315h, 315i, 315j, 315k, or 315l) of the base 310, and a blade tooth (351a2, 351b2, 351c2, 351d2, 352a2, 352b2, 352c2, 352d2, 353a2, 353b2, 353c2, or 353d2) configured to engage the rotation plate teeth 331a of the rotation plate 330. That is, each of the plurality of blades (351a, 351b, 351c, 351d, 352a, 352b, 352c, 352d, 353a, 353b, 353c, and 353d) may have a blade tooth form (351a2, 351b2, 351c2, 351d2, 352a2, 352b2, 352c2, 352d2, 353a2, 353b2, 353c2, or 353d2) at an outer end portion thereof, and the rotation plate 330 may have a rotation plate tooth form 331a configured to engage the blade teeth (351a2, 351b2, 351c2, 351d2, 352a2, 352b2, 352c2, 352d2, 353a2, 353b2, 353c2, or 353d2) positioned on each of the plurality of blades (351a, 351b, 351c, 351d, 352a, 352b, 352c, 352d, 353a, 353b, 353c, and 353d) on an inner circumferential surface thereof. A first edge of the shielding section (352a4, 352b4, 352c4, 352d4, 353a4, 353b4, 353c4, or 353d4) of the blade may extend in a straight line from the driving section (352a3, 352b3, 352c3, 352d3, 353a3, 353b3, 353c3, or 353d3) toward the central opening of the base 310.

Figure 3G:
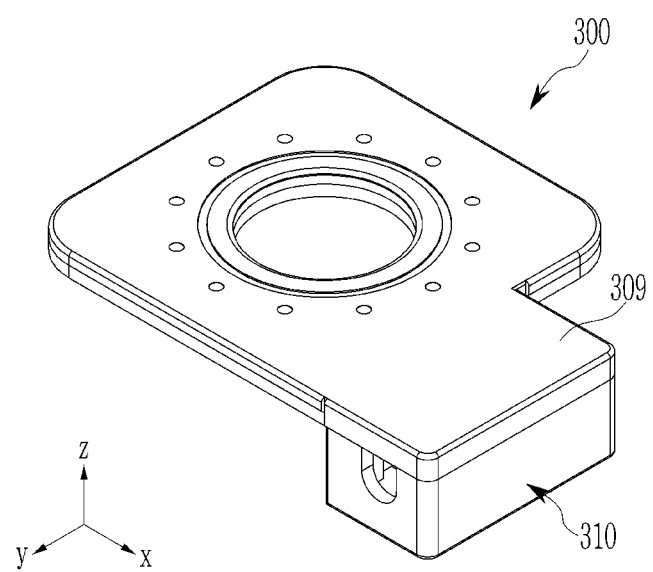
Figure 3H:
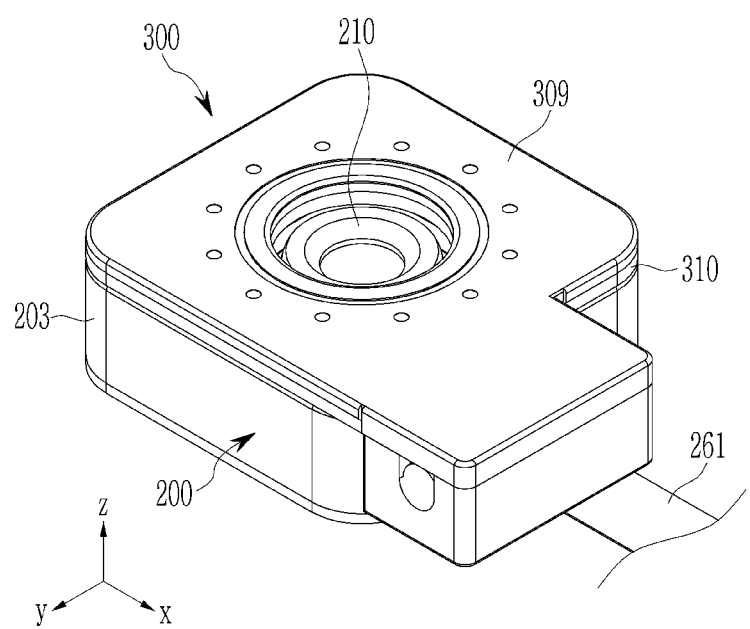

Referring to FIG. 3G and FIG. 3H, the aperture cover 309 may be coupled to an upper end of the base 310 so as to cover all of the rotation plate 330 coupled onto the base 310, the step motor 321 accommodated in the blade 350 and the base 310, and the worm gear 322. The aperture module 300 assembled in this way may be seated and fixed on the upper portion of the cover of the imaging module 200.

Figure 4:
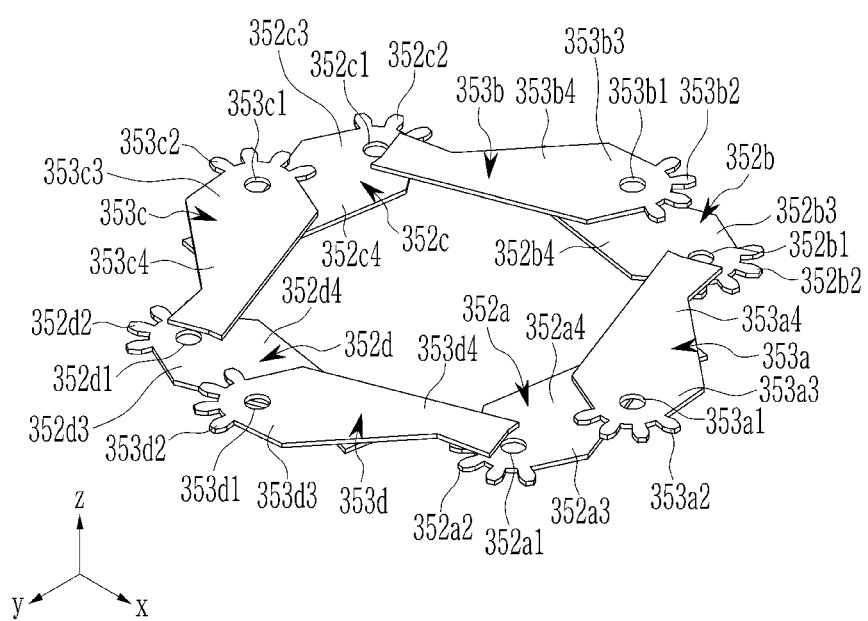
FIG. 4 illustrates a perspective view of a portion of a stacked structure of a blade applied to an aperture module of the camera module illustrated in FIG. 1.

FIG. 4 illustrates a perspective view of a portion of a stacked structure of a blade applied to an aperture module of the camera module illustrated in FIG. 1.

Hereinafter, second-stage blades (352a, 352b, 352c, and 352d) and third-stage blades (353a, 353b, 353c, and 353d) will be described as an example with reference to FIG. 4. Descriptions of respective blades (352a, 352b, 352c, 352d, 353a, 353b, 353c, and 353d) configuring the second- or third-stage may be similarly applied to respective blades (351a, 351b, 351c, and 351d) configuring the first-stage. In addition, descriptions of the relationship between the second-stage blades (352a, 352b, 352c, and 352d) and the third-stage blades (353a, 353b, 353c, and 353d) may be similarly applied between the first-stage blades (351a, 351b, 351c, and 351d) and the second-stage blades (352a, 352b, 352c, and 352d).

Each of the blades (352a, 352b, 352c, 352d, 353a, 353b, 353c, and 353d) may include a driving section (352a3, 352b3, 352c3, 352d3, 353a3, 353b3, 353c3, or 353d3) that is moved by receiving a driving force, and a shielding section (352*a*4, 352*b*4, 352*c*4, 352*d*4, 353*a*4, 353*b*4, 353*c*4, or 353*d*4) extending from the driving section to form an incident hole of various sizes.

The driving section (352*a*3, 352*b*3, 352*c*3, 352*d*3, 353*a*3, 353*b*3, 353*c*3, or 353*d*3) of the blade may include a fixing shaft hole (352*a*1, 352*b*1, 352*c*1, 352*d*1, 353*a*1, 353*b*1, 353*c*1, or 353*d*1) coupled to the fixing shaft protrusion of the base 310 (315*e*, 315*f*, 315*g*, 315*h*, 315*i*, 315*j*, 315*k*, or 315*l*).

A first edge of the shielding section (352*b*4, 352*c*4, 352*d*4, 353*a*4, 353*b*4, 353*c*4, or 353*d*4) of the blade may extend in a straight line from the driving section (352*a*3, 352*b*3, 352*c*3, 352*d*3, 353*a*3, 353*b*3, 353*c*3, or 353*d*3) toward the central opening of the base 310. The shielding section (352*a*4, 352*b*4, 352*c*4, 352*d*4, 353*a*4, 353*b*4, 353*c*4, or 353*d*4) of the blade may have two edges bent at different angles at a second edge that are directed from the driving section (352*a*3, 352*b*3, 352*c*3, 352*d*3, 353*a*3, 353*b*3, 353*c*3, or 353*d*3) toward the inner circumference of the rotation plate 330 and opposite to a first edge. As the edge positioned at the second edge of each blade (352*a*, 352*b*, 352*c*, 352*d*, 353*a*, 353*b*, 353*c*, or 353*d*) and the guide member (316*a*, 316*b*, 316*c*, 316*d*, 316*e*, 316*f*, 316*g*, or 316*h*) disposed on the base 310 contact each other, the driving range of each blade (352*a*, 352*b*, 352*c*, 352*d*, 353*a*, 353*b*, 353*c*, or 353*d*) may be limited.

Each blade (352*a*, 352*b*, 352*c*, 352*d*, 353*a*, 353*b*, 353*c*, or 353*d*) is driven to rotate about the fixing shaft hole (352*a*1, 352*b*1, 352*c*1, 352*d*1, 353*a*1, 353*b*1, 353*c*1, or 353*d*1) of the driving section so that the shielding section (352*a*4, 352*b*4, 352*c*4, 352*d*4, 353*a*4, 353*b*4, 353*c*4, or 353*d*4) may open and close the central opening of the base 310. The first edge extending in a straight line of the shielding section (352*a*4, 352*b*4, 352*c*4, 352*d*4, 353*a*4, 353*b*4, 353*c*4, or 353*d*4) of each blade is combined with the first edges extending in a straight line of the shielding section (352*a*4, 352*b*4, 352*c*4, 352*d*4, 353*a*4, 353*b*4, 353*c*4, or 353*d*4) of the blade disposed at the other portion to form an edge of the incident hole. The shielding section (352*a*4, 352*b*4, 352*c*4, 352*d*4, 353*a*4, 353*b*4, 353*c*4, or 353*d*4) of each of the plurality of blades may include an inner end portion that connects the first edge and the second edge and is directed to the central opening of the base 310. In a state in which the central opening of the base 310 is maximally blocked, the inner end portion thereof may be configured to partially contact a first edge of a blade disposed adjacent to the same stage.

The plurality of blades 350 may be stacked so that the shielding section of the blade disposed at the lower stage in the stacking direction overlaps the blade disposed at the upper stage in the stacking direction. That is, the third-stage blades (353*a*, 353*b*, 353*c*, and 353*d*) stacked thereon after the second-stage blades (352*a*, 352*b*, 352*c*, and 352*d*) are disposed may be stacked so that the shielding sections (352*a*4, 352*b*4, 352*c*4, and 352*d*4) of the second-stage blades overlap the third-stage blades (353*a*, 353*b*, 353*c*, and 353*d*).

In a state in which the central opening is fully opened, the first-stage blades (351*a*, 351*b*, 351*c*, and 351*d*) may be disposed to have a portion overlapping the second-stage blades (352*a*, 352*b*, 352*c*, and 352*d*), and the second-stage blades (352*a*, 352*b*, 352*c*, and 352*d*) may be disposed to have a portion overlapping the third-stage blades (353*a*, 353*b*, 353*c*, and 353*d*). Therefore, smooth operation is possible without collision between the blades (351*a*, 351*b*, 351*c*, 351*d*, 352*a*, 352*b*, 352*c*, 352*d*, 353*a*, 353*b*, 353*c*, and 353*d*) even when the incident hole of the aperture module 300 is reduced.

Figure 5:
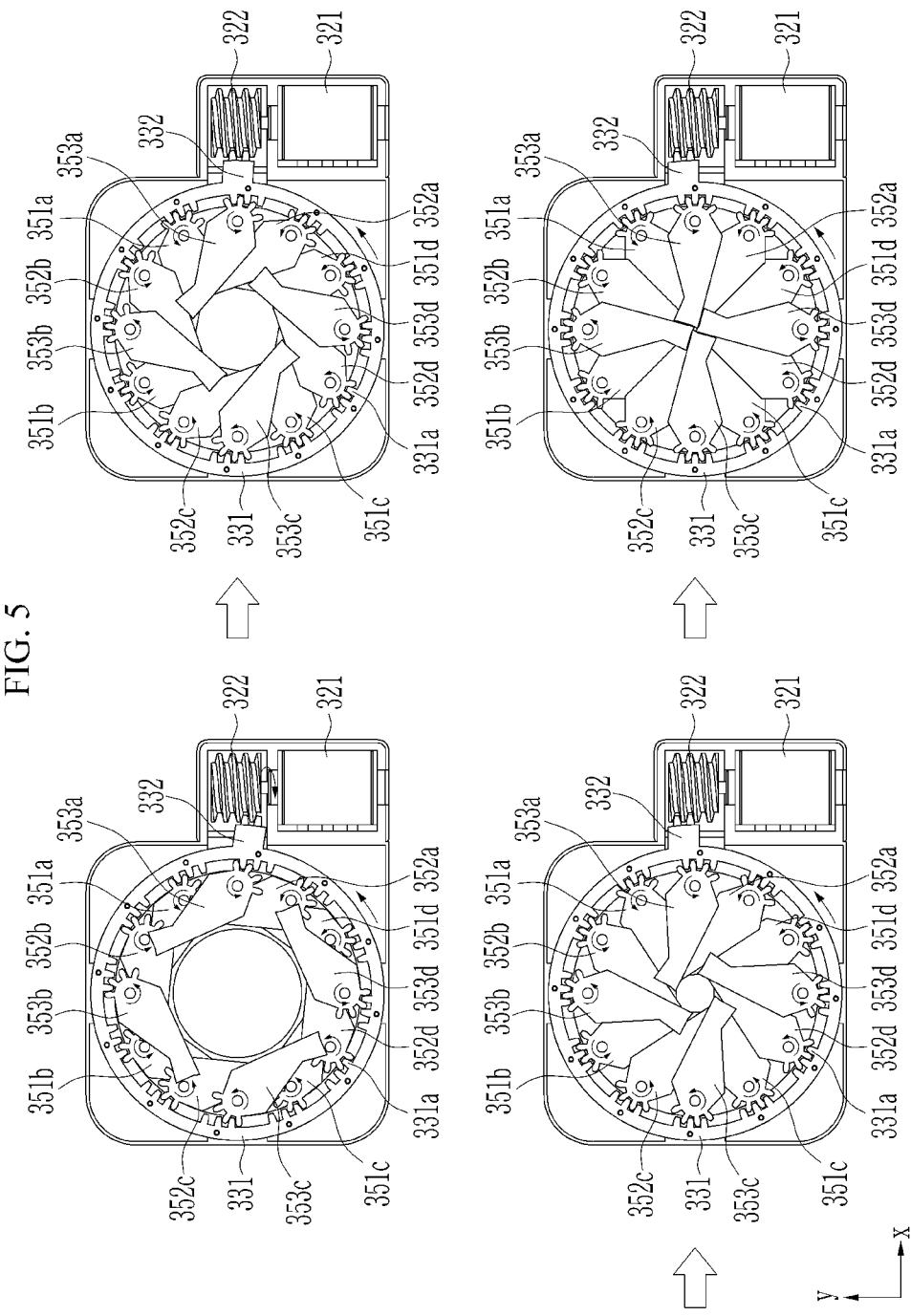
FIG. 5 sequentially illustrates top plan views of a driving process of the aperture module illustrated in FIG. 4.

FIG. 5 sequentially illustrates top plan views of a driving process of the aperture module illustrated in FIG. 4.

Referring to FIG. 5, by supplying power to the step motor 321, the step motor 321 and the worm gear 322 connected to the step motor 321 may rotate in one direction (for example, a counterclockwise direction) about the axis. The extension 332 coupled with the worm gear 322 may transmit the rotational driving force of the worm gear 322 to the rotation part 331, thereby rotating the rotation plate 330 in a counterclockwise direction and operating the blades (351*a*, 351*b*, 351*c*, 351*d*, 352*a*, 352*b*, 352*c*, 352*d*, 353*a*, 353*b*, 353*c*, and 353*d*) coupled to the rotation plate 330.

As the rotation plate teeth 331*a* of the rotation plate 330 move in engagement with the blade teeth (351*a*2, 351*b*2, 351*c*2, 351*d*2, 352*a*2, 352*b*2, 352*c*2, 352*d*2, 353*a*2, 353*b*2, 353*c*2, or 353*d*2) of each of the plurality of blades (351*a*, 351*b*, 351*c*, 351*d*, 352*a*, 352*b*, 352*c*, 352*d*, 353*a*, 353*b*, 353*c*, and 353*d*), each of the plurality of blades (351*a*, 351*b*, 351*c*, 351*d*, 352*a*, 352*b*, 352*c*, 352*d*, 353*a*, 353*b*, 353*c*, and 353*d*) rotates around the fixing shaft protrusion (315*a*, 315*b*, 315*c*, 315*d*, 315*e*, 315*f*, 315*g*, 315*h*, 315*i*, 315*j*, 315*k*, or 315*l*) of the base 310, and the shielding sections (352*a*4, 352*b*4, 352*c*4, 352*d*4, 353*a*4, 353*b*4, 353*c*4, and 353*d*4) gradually cover the central opening of the base 310. In this case, the rim of the incident hole of the aperture module 300 may be configured to form a maximum dodecagonal shape by the first edges of each of the plurality of blades (351*a*, 351*b*, 351*c*, 351*d*, 352*a*, 352*b*, 352*c*, 352*d*, 353*a*, 353*b*, 353*c*, and 353*d*).

When the extension 332 is completely moved within the inner space of the driver case 312, the plurality of blades (351*a*, 351*b*, 351*c*, 351*d*, 352*a*, 352*b*, 352*c*, 352*d*, 353*a*, 353*b*, 353*c*, and 353*d*) may completely block the central opening of the base 310. Accordingly, the incident hole having varied diameters of the aperture module 300 may be formed by the first edges of the blades (351*a*, 351*b*, 351*c*, 351*d*, 352*a*, 352*b*, 352*c*, 352*d*, 353*a*, 353*b*, 353*c*, and 353*d*).

Figure 6:
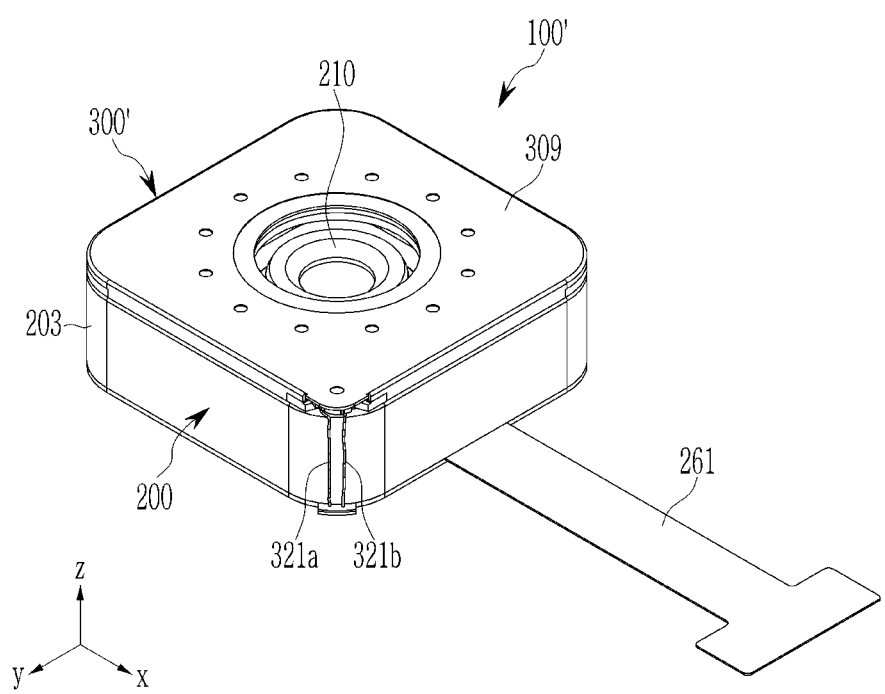
FIG. 6 illustrates a perspective view of an appearance of a camera module according to another example.
Figure 7:
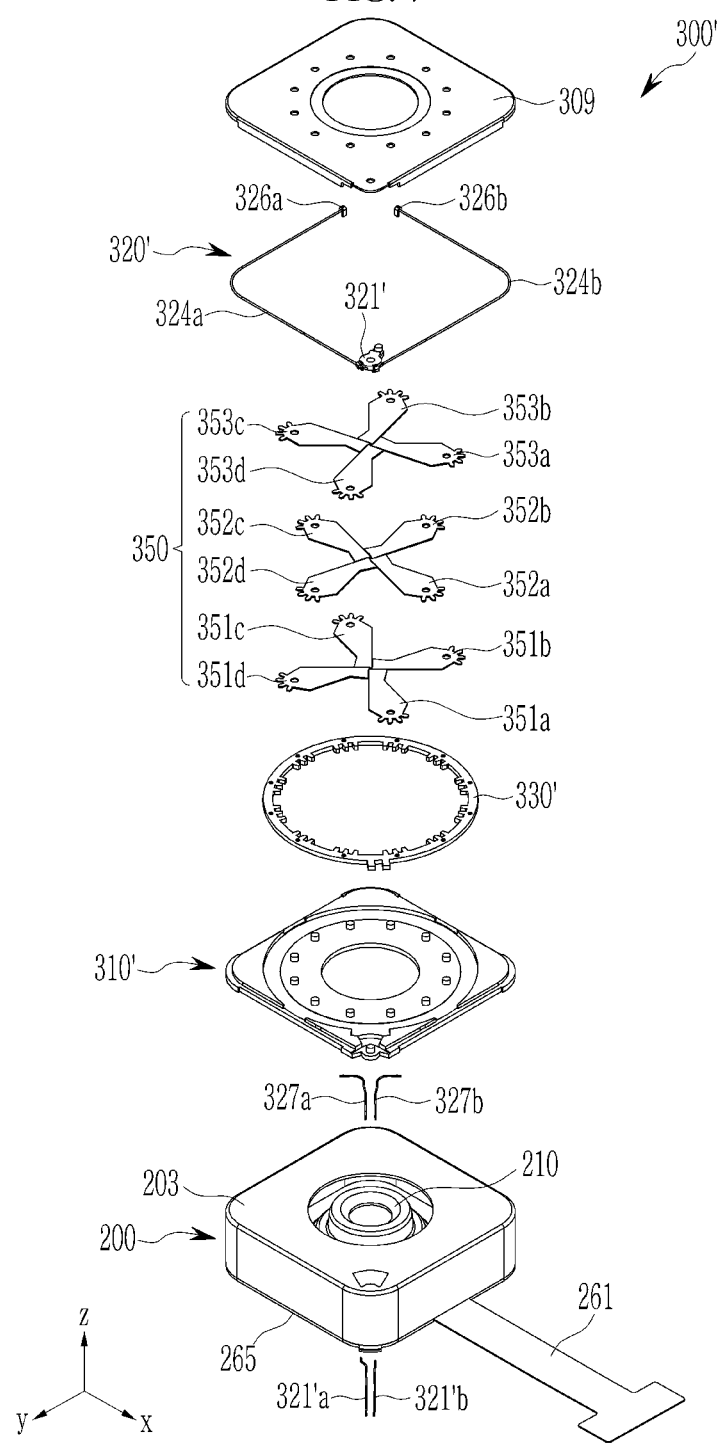
FIG. 7 illustrates an exploded perspective view of an aperture module of the camera module illustrated in FIG. 6.

FIG. 6 illustrates a perspective view of an appearance of a camera module according to another example, and FIG. 7 illustrates an exploded perspective view of an aperture module of the camera module illustrated in FIG. 6.

Referring to FIG. 6 and FIG. 7, a camera module 100' may include a housing 203 defining an inner space, a lens driving module 210 accommodated in the inner space, and an aperture module 300' disposed in front of the lens driving module 210 to adjust a size of the incident hole.

An inner space of the housing 203 in which the lens driving module 210 is accommodated may be covered with a cover. An image sensor unit may be disposed on a circuit board 265 on a bottom surface of the housing 203 to generate an electrical image signal in response to incident light information. A flexible printed circuit board 261 may extend outside the housing 203 to transmit the generated image signal to an external circuit. The lens driving module 210 accommodated in the housing 203 covered with the cover may configure an imaging module 200.

The lens driving module 210 may include a lens module including a lens, and a lens driver for driving the lens module in an optical axis direction or in a direction perpendicular to the optical axis.

The lens module may include a lens barrel including a plurality of lenses for imaging a subject and a holder for accommodating the lens barrel. The lens module may be configured to be accommodated in a carrier to move in an optical axis direction for auto-focusing. In addition, the lens module may be driven in a direction perpendicular to the optical axis for optical image stabilization within the carrier.

The lens driver may include an auto focus (AF) driver for driving the lens module together with the carrier in an optical axis direction, and an optical image stabilization (OIS) driver for driving the lens module in a direction perpendicular to the optical axis in the carrier. The AF driver may adjust the focus by moving the lens module in the optical axis direction (a z-axis direction in the drawing), and the OIS driver may correct hand shake or screen shake when shooting by moving the lens module in a direction perpendicular to the optical axis (an x-axis direction or a y-axis direction in the drawing).

For example, the AF driver may include an AF driving magnet and an AF driving coil, and the OIS driver may include an OIS driving magnet and an OIS driving coil. However, the lens driver is not limited thereto, and may be implemented as various driving parts for moving the lens module in the optical axis direction or in a direction perpendicular to the optical axis, which also are within the scope of the present disclosure.

Referring to FIG. 7, the aperture module 300' applied to the camera module 100' may be disposed at an upper portion of the imaging module 200, and may be positioned in front of the lens driving module 210 based on a light incident direction. The aperture module 300' may be configured by sequentially stacking and combining a rotation plate 330' and blades (350; 351a, 351b, 351c, 351d, 352a, 352b, 352c, 352d, 353a, 353b, 353c, and 353d) stacked sequentially on the base 310'. In addition, an aperture driver 320' may be coupled to the base 310' to provide driving force to the blade 350. The aperture driver 320' may include a rotor 321', wires (321'a, 321'b, 327a, and 327b), shape memory alloy (SMA) wires (324a and 324b), and clamps (326a and 326b). An aperture cover 309 may be coupled thereto to cover an upper portion thereof to protect the components of the aperture module 300.

The aperture module 300' may include 12 three-stage blades (350; 351a, 351b, 351c, 351d, 352a, 352b, 352c, 352d, 353a, 353b, 353c, and 353d). That is, the blade 350 may be stacked in three stages on the rotation plate 330, and four blades (of 351a, 351b, 351c, 351d, 352a, 352b, 352c, 352d, 353a, 353b, 353c, and 353d) may be disposed to not overlap each other at each stage.

FIG. 8A to FIG. 8H illustrate perspective views of a process of assembling components of an aperture module of the camera module illustrated in FIG. 6.

Figure 8A:
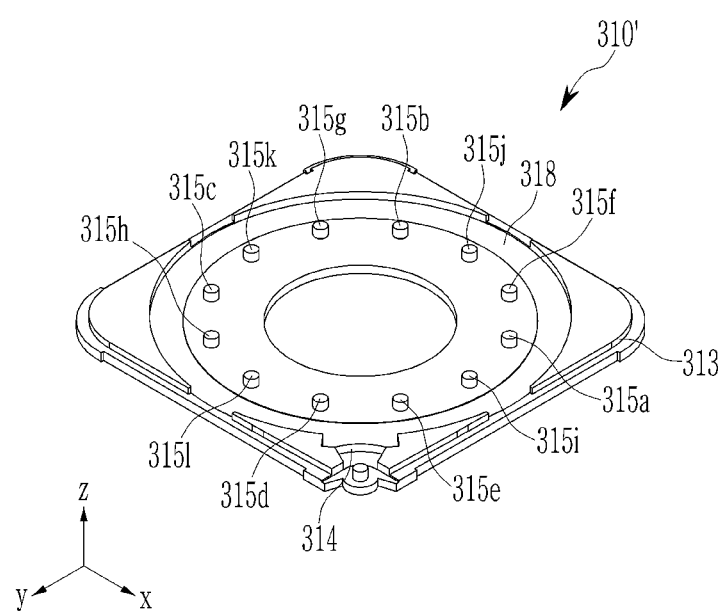
FIG. 8A, 8B, 8C, 8D, 8E, 8F, 8G, and FIG. 8H illustrate perspective views of a process of assembling components of an aperture module of the camera module illustrated in FIG. 6.

Referring to FIG. 8A, the base 310' has a central opening, and may be formed to have a planar shape that is substantially quadrangular or square. A rotation shaft pillar 311' protrudes upwardly from an upper end of one corner area of the base 310', and a rotation limiting area 314 may be positioned around the rotation shaft pillar 311'. The rotation limiting area 314 may have sidewalls positioned at both sides thereof to limit a rotational area of a rotor 321'.

The base 310' may include a step portion 313 extending along the edge. The step portion 313 may have a shape protruding upward by being recessed by a predetermined distance from an outermost edge of the base 310' toward the center. The step portion 313 may be formed to surround an edge of the base 310 in an area excluding the rotation limiting area 314.

The base 310' includes a seating groove 318 in which the rotation plate 330' is seated, and the seating groove 318 may be formed to have a shape that matches a shape of the rotation plate 330', and for example, it may be formed to have an annular shape. On a plane between the seating groove 318 of the base 310' and the central opening thereof, fixing shaft protrusions (315a, 315b, 315c, 315d, 315e, 315f, 315g, 315h, 315i, 315j, 315k, and 315l) may be disposed at equal angles around the optical axis along an inner circumference of the seating groove 318.

Figure 8B:
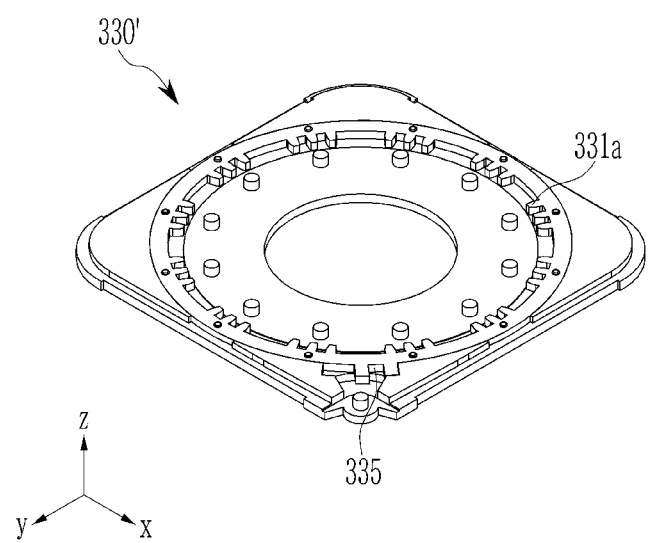

Referring to FIG. 8B, the rotation plate 330' may be inserted and seated in the seating groove 318 of the base 310'. The rotation plate 330' may be formed of an annular disc, and may be rotatably seated about the optical axis on the base 310'. The rotation plate 330' may be provided with a rotation plate tooth form 331a on an inner circumferential surface thereof. The tooth form 331 of the rotation plate may have a form in which tooth form structures are disposed at regular intervals based on the optical axis along the inner circumference of the rotation plate 330'. In addition, a driving protrusion fastening groove 335 may be positioned at one outer portion of the rotation plate 330' to be fastened to the rotor 321'.

Figure 8C:
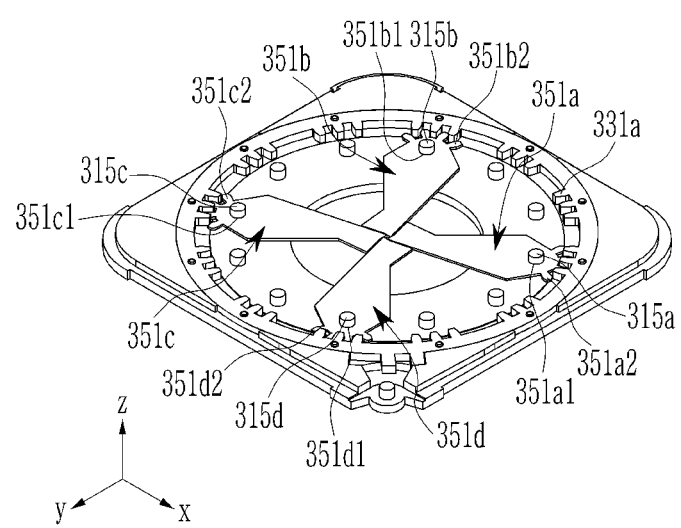
Figure 8D:
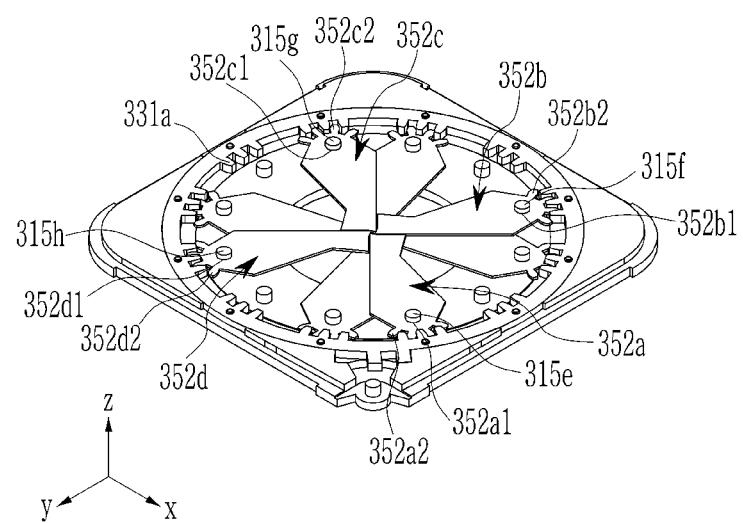
Figure 8E:
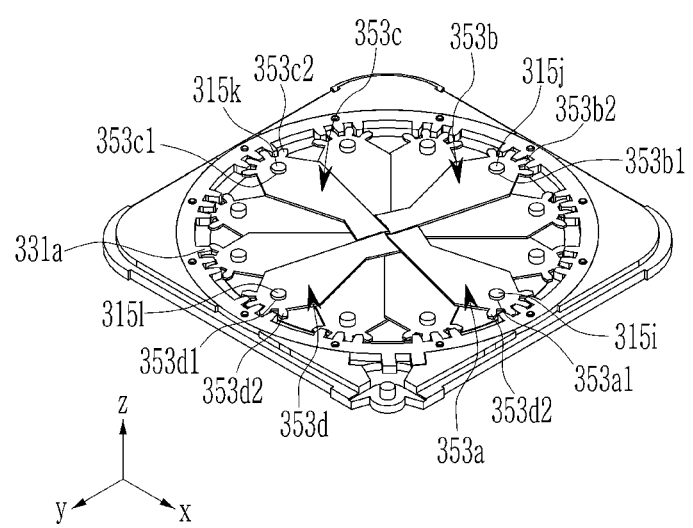

Referring to FIG. 8C to FIG. 8E, the plurality of blades (351a, 351b, 351c, 351d, 352a, 352b, 352c, 352d, 353a, 353b, 353c, and 353d) may be sequentially stacked in three stages inside the inner circumferential surface of the rotation plate 330'. The plurality of blades (351a, 351b, 351c, 351d, 352a, 352b, 352c, 352d, 353a, 353b, 353c, and 353d) may be stacked to form the same plane as the rotation plate 330'. That is, the plurality of blades (351a, 351b, 351c, 351d, 352a, 352b, 352c, 352d, 353a, 353b, 353c, and 353d) stacked inside the inner circumferential surface of the rotation plate 330' may be maintained to have the same height as the rotation plate 330'. Four blades (351a, 351b, 351c, and 351d; 352a, 352b, 352c, and 352d; or 353a, 353b, 353c, and 353d) may be disposed at each stage to form point symmetry with respect to the center of the opening of the base 310'. In addition, each of the plurality of blades (351a, 351b, 351c, 351d, 352a, 352b, 352c, 352d, 353a, 353b, 353c, and 353d) may be disposed to partially overlap two blades (of 351a, 351b, 351c, 351d, 352a, 352b, 352c, 352d, 353a, 353b, 353c, 353d) disposed at an upper portion or a lower portion adjacent to each other in a state in which the central opening of the base 310' is fully opened.

Each of the plurality of blades (351a, 351b, 351c, 351d, 352a, 352b, 352c, 352d, 353a, 353b, 353c, and 353d) may include a driving section (352a3, 352b3, 352c3, 352d3, 353a3, 353b3, 353c3, or 353d3) including a fixing shaft hole (351a1, 351b1, 351c1, 351d1, 352a1, 352b1, 352c1, 352d1, 353a1, 353b1, 353c1, or 353d1) and a blade tooth form (351a2, 351b2, 351c2, 351d2, 352a2, 352b2, 352c2, 352d2, 353a2, 353b2, 353c2, or 353d2), and a shielding section (352b4, 352c4, 352d4, 353a4, 353b4, 353c4, or 353d4), as described above. That is, each of the plurality of blades (351a, 351b, 351c, 351d, 352a, 352b, 352c, 352d, 353a, 353b, 353c, and 353d) is substantially the same as the blade described above with reference to FIG. 1 to FIG. 5.

Figure 8F:
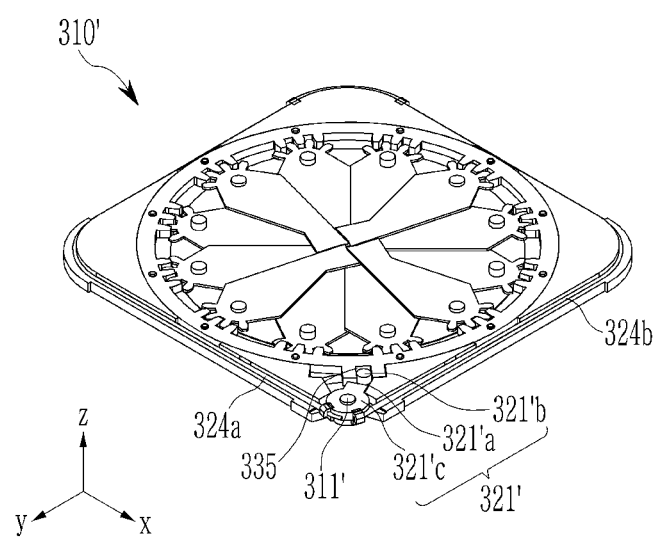

Referring to FIG. 8F, the rotor 321' may be coupled with the rotation plate 330' to provide rotation driving force. The rotor 321' may include a rotation driving part 321'c having a through-hole into which the rotation axis pillar 311 of the base 310' is inserted, and a driving arm part 321'a extending therefrom to be coupled to the rotation plate 330'. The driving arm part 321'a includes a driving protrusion 321'b protruding to an upper end from an end portion of an arm integrally extending from the rotation driving part 321'c, and the driving protrusion 321'b may be coupled to the driving protrusion fastening groove 335 of the rotation plate 330'.

The shape memory alloy wires 324a and 324b may be connected to the rotor 321' to be configured to rotate the rotor 321' according to an input electrical signal. That is, one end portions of the shape memory alloy wires 324a and 324b may be fixed to the rotation driving part 321c' of the rotor 321', and the other end portions thereof may be fixed to the base 310'. In this case, the shape memory alloy wires 324a and 324b may be supported on the step portion 313 of the base 310', and may extend along the edge of the base 310'.

The shape memory alloy wires 324a and 324b include a first shape memory alloy wire 324a and a second shape memory alloy wire 324b that extend to both sides of rotor 321'. The first shape memory alloy wire 324a and the second shape memory alloy wire 324b may extend in opposite directions along the edge of the base 310' to have a symmetrical structure.

Figure 8G:
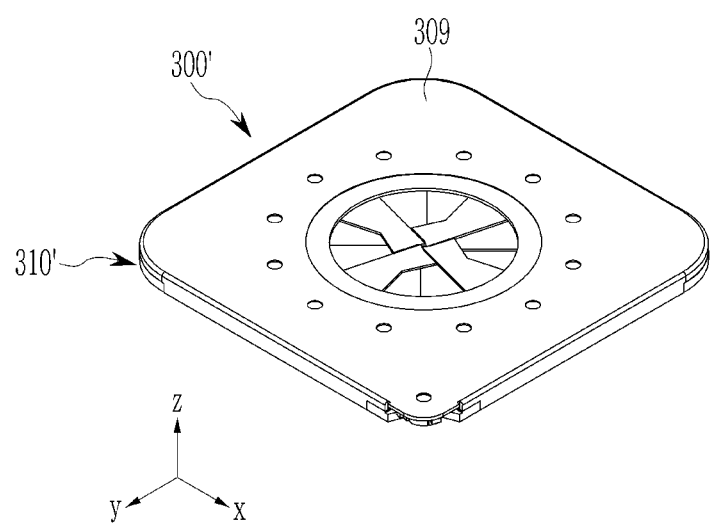
Figure 8H:
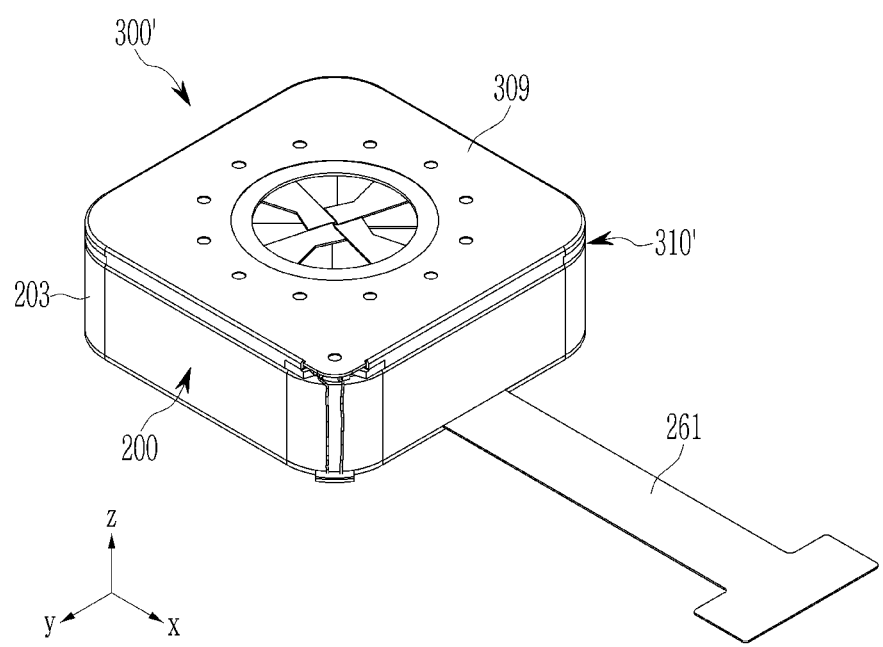

Referring to FIG. 8G and FIG. 8H, the aperture cover 309 may be coupled to the upper end of the base 310' to cover all of the rotation plate 330', the rotor 321', the blade 350 and the shape memory alloy wires 324a and 324b coupled on the base 310'. The aperture module 300' assembled in this way may be seated and fixed on the upper portion of the cover of the imaging module 200.

Figure 9:
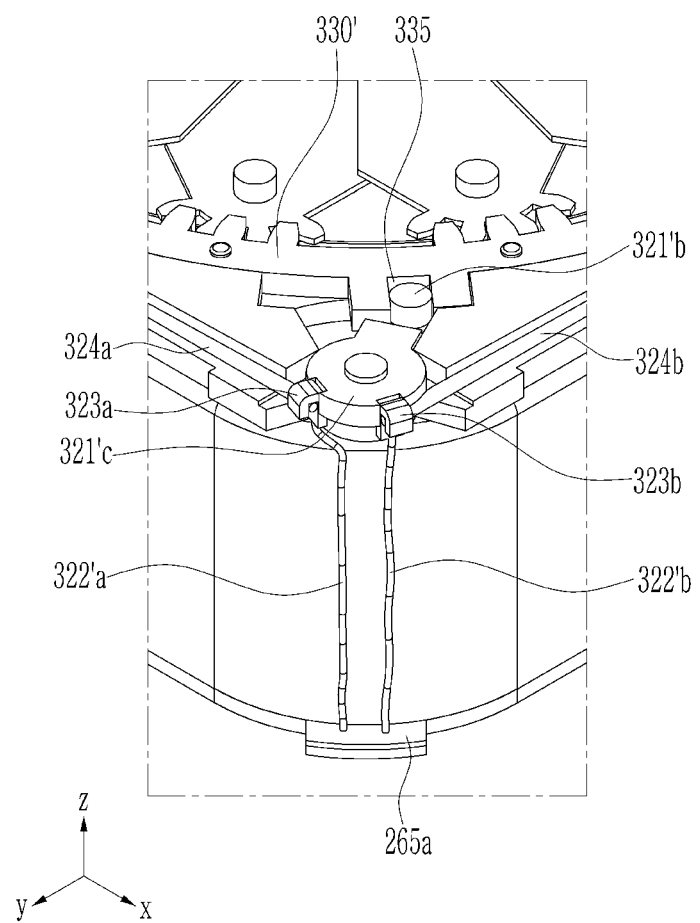
FIG. 9 illustrates a partial perspective view of a corner portion of a rotor disposed to an aperture module of the camera module illustrated in FIG. 6.
Figure 10:
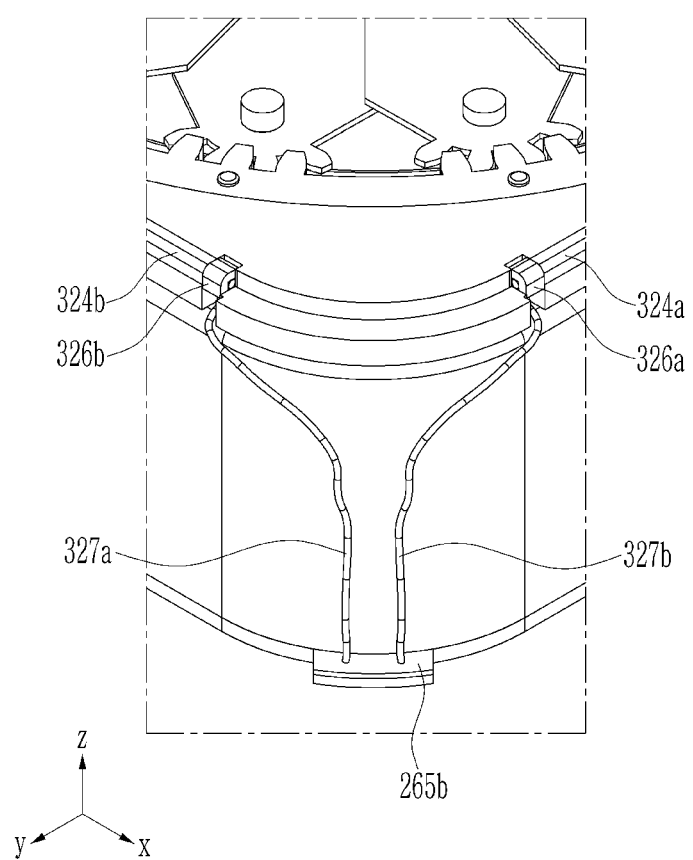
FIG. 10 illustrates a partial perspective view of a corner portion of a shape memory alloy wire fixed to a base in an aperture module of the camera module illustrated in FIG. 6.

FIG. 9 illustrates a partial perspective view of a corner portion of a rotor disposed to an aperture module of the camera module illustrated in FIG. 6, and FIG. 10 illustrates a partial perspective view of a corner portion of a shape memory alloy wire fixed to a base in an aperture module of the camera module illustrated in FIG. 6.

Referring to FIG. 9, one end of each of portions of the shape memory alloy wires 324a and 324b may be fixed to the side surface of the rotation driving part 321'c of the rotor 321' through the clamps 323a and 323b. That is, the first shape memory alloy wire 324a and the second shape memory alloy wire 324b may be respectively fixed to the rotation driving part 321'c of the rotor 321' to extend along the step portion 313 of the base 310' in different directions.

The clamps 323a and 323b for fixing the shape memory alloy wires 324a and 324b to the rotation driver 321'c may be made of conductive terminals, and may be electrically connected to a circuit board 265 disposed on a bottom of a housing 203 through wires 322'a and 322'b. The circuit board 265 includes an extension 265a protruding from the side surface of the housing 203, and the wires 322'a and 322'b extending outside the housing 203 may be connected to the extension 265a. The clamps 323a and 323b may function as the driving power input terminals of the shape memory alloy wires 324a and 324b.

Referring to FIG. 9, the other end portions of the shape memory alloy wires 324a and 324b may be fixed to the base 310' in a diagonally opposite corner area of one corner area of the base 310' on which the rotation axis pillar 311' is positioned. That is, the first shape memory alloy wire 324a and the second shape memory alloy wire 324b may be spaced apart from each other at the step portion 313 of the base 310' to be fixed through the clamps 326a and 326b, respectively.

The clamps 326a and 326b for fixing the shape memory alloy wires 324a and 324b to the base 310' may be made of conductive terminals, and may be electrically connected to the circuit board 265 disposed on a bottom of the housing 203 through the wires 327a and 327b. The circuit board 265 includes an extension 265b protruding from the side surface of the housing 203, and the wires 327a and 327b extending outside the housing 203 may be connected to the extension 265b. The clamps 326a and 326b may function as the driving power input terminals of the shape memory alloy wires 324a and 324b.

Figure 11:
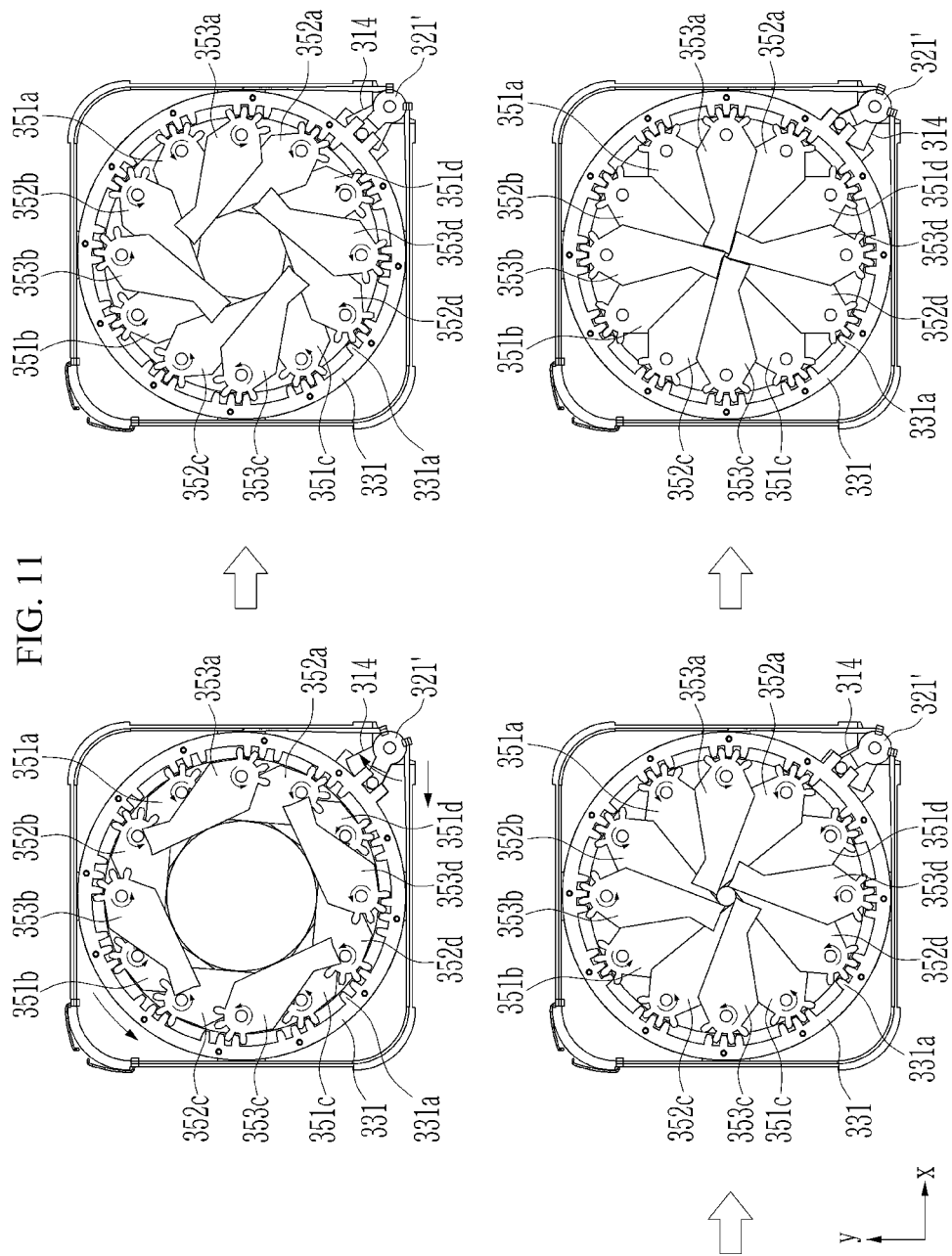
FIG. 11 sequentially illustrates top plan views of a driving process of the aperture module of the camera module illustrated in FIG. 6.

FIG. 11 sequentially illustrates top plan views of a driving process of the aperture module of the camera module illustrated in FIG. 6.

Referring to FIG. 11, by supplying power to the shape memory alloy wires 324a and 324b, the rotor 321' of the aperture module 300' may be rotated clockwise by a contracting driving force. Accordingly, the rotation plate 330' connected to the rotor 321' may be rotated counterclockwise and the blade (351a, 351b, 351c, 351d, 352a, 352b, 352c, 352d, 353a, 353b, 353c, or 353d) coupled to the rotation plate 330' may be driven.

As the rotation plate teeth 331a of the rotation plate 330' move in engagement with the blade teeth form (351a2, 351b2, 351c2, 351d2, 352a2, 352b2, 352c2, 352d2, 353a2, 353b2, 353c2, or 353d2) of each of the plurality of blades (351a, 351b, 351c, 351d, 352a, 352b, 352c, 352d, 353a, 353b, 353c, and 353d), each of the plurality of blades (351a, 351b, 351c, 351d, 352a, 352b, 352c, 352d, 353a, 353b, 353c, and 353d) rotates around the fixing shaft protrusion (315a, 315b, 315c, 315d, 315e, 315f, 315g, 315h, 315i, 315j, 315k, or 315l) of the base 310', and the shielding sections (352a4, 352b4, 352c4, 352d4, 353a4, 353b4, 353c4, and 353d4) gradually cover the central opening of the base 310'. In this case, the rim of the incident hole of the aperture module 300' may be configured to form a maximum dodecagonal shape by the first edges of each of the plurality of blades (351a, 351b, 351c, 351d, 352a, 352b, 352c, 352d, 353a, 353b, 353c, and 353d).

When the rotor 321' is completely moved within the rotation limiting area 314, the plurality of blades (351a, 351b, 351c, 351d, 352a, 352b, 352c, 352d, 353a, 353b, 353c, and 353d) may completely block the central opening of the base 310'. Accordingly, the incident hole having varied diameters of the aperture module 300' may be formed by the first edges of the blades (351a, 351b, 351c, 351d, 352a, 352b, 352c, 352d, 353a, 353b, 353c, and 353d).

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An aperture module, comprising:
   a base defining a central opening;
   a rotation plate rotatably seated on the base about an optical axis;
   an aperture driver coupled with the rotation plate and configured to rotate the rotation plate according to an input electrical signal; and
   a plurality of blades disposed inside the rotation plate and interlocking with the rotation of the rotation plate to form an incident hole of variable size,
   wherein each of the plurality of blades includes a blade tooth form at an outer end portion thereof, and the rotation plate includes a rotation plate tooth form disposed along an inner circumferential surface thereof and configured to engage with a respective blade tooth form of each of the plurality of blades, and wherein the rotation plate includes a rotation part configured to rotate by a driving force provided by the aperture driver and an extension connected to an outer portion of the rotation part and extending in an optical axis direction and including a plurality of protrusions protruding outward to be gear-coupled with the aperture driver.

2. The aperture module of claim 1, wherein the aperture driver includes a worm gear coupled to the extension portion of the rotation plate and a motor having one end connected to the worm gear and configured to rotate the worm gear according to the input electrical signal.

3. The aperture module of claim 2, wherein the base includes a driver case defining an inner space in which the motor and the worm gear are seated at one side of the base.

4. The aperture module of claim 1, wherein the plurality of blades are stacked to form a common plane with the rotation part.

5. The aperture module of claim 1, wherein the plurality of blades are stacked in at least three stages inside the inner circumferential surface of the rotation plate, and each stage includes at least four blades disposed so as to not overlap each other.

6. The aperture module of claim 1, wherein each of the plurality of blades includes a driving section including a fixing shaft hole coupled to a fixing shaft protrusion protruding from the base and the respective blade tooth form and a shielding section having a first edge extending straight from the driving section toward the central opening.

7. The aperture module of claim 6, wherein the shielding section of each of the plurality of blades includes a second edge extending from the driving section toward the inner circumferential surface of the rotation plate and opposite to the first edge, and the second edge includes two sides bent at different angles.

8. The aperture module of claim 7, wherein the shielding section of each of the plurality of blades includes an inner end portion connecting the first edge and the second edge, and in a state in which the central opening of the base is maximally blocked, the inner end portion is configured to partially contact a first edge of an adjacent blade.

9. The aperture module of claim 1, wherein each of the plurality of blades is configured to partially overlap two blades adjacent to each other and disposed at an upper stage or a lower stage in a state in which the central opening of the base is fully opened.

10. The aperture module of claim 1, wherein the plurality of blades are configured to form a maximum dodecagonal incident hole.

11. A camera module comprising:
a housing defining an inner space;
a lens driving module accommodated in the inner space of the housing; and
an aperture module disposed in front of the lens driving module and configured to adjust a size of an incident hole,
wherein the aperture module includes:
a base defining a central opening;
a rotation plate rotatably seated on the base about an optical axis;
an aperture driver coupled with the rotation plate and configured to rotate the rotation plate according to an input electrical signal; and
a plurality of blades disposed inside the rotation plate and interlocking with the rotation of the rotation plate to form the incident hole,
wherein each of the plurality of blades includes a blade tooth form at an outer end portion thereof, and the rotation plate includes a rotation plate tooth form disposed along an inner circumferential surface thereof and configured to engage with a respective blade tooth form of each of the plurality of blades, and
wherein the rotation plate includes a rotation part configured to rotate by a driving force provided by the aperture driver and an extension connected to an outer portion of the rotation part and extending in an optical axis direction and including a plurality of protrusions protruding outward to be gear-coupled with the aperture driver.

12. The camera module of claim 11, wherein the aperture driver includes a worm gear coupled to the extension portion of the rotation plate and a motor having one end connected to the worm gear and configured to rotate the worm gear according to the input electrical signal.

13. The camera module of claim 12, wherein the rotation plate includes a rotation part configured to rotate by a driving force provided by the worm gear, and the extension portion is connected to an outer portion of the rotation part and gear-coupled with the worm gear, and
the plurality of blades are stacked to form a common plane with the rotation part.

14. The camera module of claim 11, wherein the plurality of blades are stacked in at least three stages inside the inner circumferential surface of the rotation plate, and each stage includes at least four blades disposed so as to not overlap each other.

* * * * *